UNITED STATES PATENT OFFICE.

GEORGE CANNAN FLUDDER, GEORGE ERIC FLUDDER, AND ALBERT WILLIAM FLUDDER, OF ALRESFORD, COLCHESTER, ENGLAND.

PROCESS OF MANUFACTURING REFRACTORY MATERIAL.

976,996.  Specification of Letters Patent.  Patented Nov. 29, 1910.

No Drawing.  Application filed December 31, 1909.  Serial No. 535,732.

*To all whom it may concern:*

Be it known that we, GEORGE CANNAN FLUDDER, GEORGE ERIC FLUDDER, and ALBERT WILLIAM FLUDDER, brickworks engineers, subjects of the King of Great Britain, all residing at Alresford, Colchester, Essex, England, have invented certain new and useful Improvements in Processes of Manufacturing Refractory Material, of which the following is a specification.

This invention relates to the manufacture of refractory material, such as bricks, blocks, and other molded articles, and also of furnace linings, cements, and the like.

According to this invention we employ aluminium sulfate as a binder for refractory material such as quartz (or other form of silica such as flints, sand, gravel, ganister, sandstone and the like), bauxite and other suitable forms of alumina, magnesite and other suitable forms of magnesia, chrome ore and the like. We may according to this invention also mix with the silica or the like and the said binding agent a small quantity say from ½ to 10 per cent. according to circumstances of a ground magnesium silicate such as talc or steatite which acts as an agglomerant under the high temperature of the kiln.

This invention may be carried out as follows: Silica in the form of ganister for example, is ground and graded to such sizes as circumstances require; it is then mixed in a heated mixer with a hot solution of aluminium sulfate and the whole thoroughly incorporated and brought to a proper state for molding. Bricks and such articles may be molded under mechanical pressure in a heated mold after which they are subjected to a drying heat to make them fit to handle; they are then set in a kiln and burned. Should the bricks contain a large percentage of water they must be placed in a cool chamber, heat being applied very gradually. When a harder and stronger article is required magnesium silicate should be added. For this purpose the silicate, in the form of talc for example, is ground to a very fine powder and mixed with the silica before the addition of the aluminium sulfate solution or it may be suspended in the said solution before addition to the silica. Or ganister may be ground and tempered in a tempering pan where it is moistened with a solution of aluminium sulfate holding in suspension magnesium silicate (previously ground to a very fine powder) and brought to a proper consistency for molding. When the solution is only used as a binding agent for an unburned article one per cent. compared with the mass to be bound of aluminium sulfate gives good results, when used as an agglomerant for articles burned to a high temperature a larger percentage say 2 or 3 per cent. should be added and where it is desired to incorporate alumina with the aggregate it is added to the extent desired. The quantity of magnesium silicate it is desirable to add depends partly upon the chemical composition of the raw material and partly upon the nature of the article it is desired to produce. The addition of 2 per cent. is when the article is subjected to a high temperature in a kiln usually sufficient to sinter the aggregate and yield hard sonorous bricks and the like.

When silica in the form of sand is used from 10 to 20 per cent. of finely ground silica such as flint or sand is preferably added the percentage varying with the physical condition of the sand as by so doing more dense and better bonded articles are produced. The aluminous material known as bauxite should first be "dead-burned" and then disintegrated to the required grades, after which it may either be mixed in a heated mixer with a hot solution of aluminium sulfate, or tempered in a tempering pan mixed with the solution of aluminium sulfate, and brought to a proper consistency for molding. Magnesite and the like may be similarly treated.

A good hard brick can be made from bauxite, magnesite and chrome ore by the use of an aluminium sulfate solution without the addition of magnesium silicate. To make a furnace lining the aggregate is ground together with magnesium silicate and moistened with the solution of 1 per cent. of aluminium sulfate in water or the ground magnesium silicate may be held suspended in the solution of aluminium sulfate and so mixed with the aggregate and brought to the requisite physical condition and consistency for use.

A cement suitable for bonding refractory brickwork for example is made in a similar manner to a furnace lining but the materials should be more finely ground. The liquid, either water or a solution of aluminium sulfate, being if desired added at the time of using.

What we claim is:

1. The hereindescribed process, which consists in agglomerating a refractory substance before kilning by a solution of aluminium sulfate.

2. The hereindescribed process, which consists in agglomerating a refractory substance before heating by the addition of aluminium sulfate and hot water, molding this mixture in a heated mold, and then burning.

3. The hereindescribed process, which consists in agglomerating a mixture of silica and a magnesium silicate before kilning by a solution of aluminium sulfate.

4. The hereindescribed process which consists in agglomerating a refractory substance and a substance adapted to sinter at a high temperature by the addition before heating of aluminium sulfate and water.

5. The hereindescribed process, which consists in agglomerating a refractory substance and a material adapted to sinter at a high temperature by the addition before heating of aluminium sulfate and hot water, molding the mixture in a heated mold and then burning.

GEORGE CANNAN FLUDDER.
GEORGE ERIC FLUDDER.
ALBERT WILLIAM FLUDDER.

Witnesses as to George Cannan Fludder and George Eric Fludder:
RICE K. EVANS,
CHAS. N. DANIELS.

Witnesses as to Albert William Fludder:
F. L. RAND,
H. D. JAMESON.